US010229303B2

(12) United States Patent
Gerst, III et al.

(10) Patent No.: US 10,229,303 B2
(45) Date of Patent: Mar. 12, 2019

(54) IMAGE MODULE INCLUDING MOUNTING AND DECODER FOR MOBILE DEVICES

(71) Applicant: Cognex Corporation, Natick, MA (US)

(72) Inventors: Carl W. Gerst, III, Clifton Park, NY (US); Kai Fluegge, Aachen (DE); Mario Joussen, Nideggen (DE); Laurens Nunnink, Simpleveld (NL)

(73) Assignee: Cognex Corporation, Natick, MA (US)

( * ) Notice: Subject to any disclaimer, the term of this patent is extended or adjusted under 35 U.S.C. 154(b) by 0 days.

(21) Appl. No.: 14/137,975

(22) Filed: Dec. 20, 2013

(65) Prior Publication Data

US 2015/0178538 A1    Jun. 25, 2015

(51) Int. Cl.
*G06K 7/10* (2006.01)

(52) U.S. Cl.
CPC ....... *G06K 7/10881* (2013.01); *G06K 7/1098* (2013.01)

(58) Field of Classification Search
CPC ........ H01Q 1/521; H01Q 7/00; H01Q 1/2216; H01Q 1/243; G06K 7/10386; G06K 7/10336; G06K 7/10881; G06K 7/1443; G06K 7/10722; G06K 7/10; G06K 7/082; G06K 7/10009; G06K 7/10544; G06K 7/01; G06K 7/089; G06K 7/0004; G06K 2009/4666; G06K 9/2027; G06K 2009/6213; G06K 2209/21; G06K 9/00503; G06K 9/00543; G06K 9/00711; G06K 9/209; G06K 9/342; G06K 9/4661; G06K 9/522; G06K 9/6203; G06K 7/1095; G06K 9/00087; G06K 9/00617; G06K 9/6215; H02J 7/025; H02J 7/0044; H02J 7/0054;
(Continued)

(56) References Cited

U.S. PATENT DOCUMENTS 4,130,738 A    12/1978    Sandstedt
4,953,123 A    8/1990    Takeuchi
(Continued)

FOREIGN PATENT DOCUMENTS

CN    103336553 A    10/2013
CN    203734726        3/2014
(Continued)

*Primary Examiner* — Thien T Mai
(74) *Attorney, Agent, or Firm* — Loginov IP

(57) ABSTRACT

This invention provides a module for a handheld device. The module includes an imager with optics and image acquisition/processing processors that provide high speed acquisition and handling of acquired image data—such as IDs. The acquired image data is processed by the device processor using a module application that resides within the device. The module includes indicators and/or alarms that can indicate success in reading an ID. A subframe removably mounts within the module's main body/frame and carries the device. The subframe can vary to accommodate different devices within a single main body/frame geometry. The main body/frame includes appropriate structures (ports) to enable optical transmission to, for example, cameras and illuminators so that various native functions of the device can be employed as desired. The main body/frame can also house a battery and charging assembly that supplies power to the device and allows charging through-for example and inductive charging unit.

21 Claims, 6 Drawing Sheets

(58) Field of Classification Search
CPC .... H02J 7/0042; H02J 7/007; H04M 1/72522;
H04M 2250/22; H04M 1/21; G06F 1/26;
G06F 13/14; G06F 9/30; G06F 1/1626;
G06F 1/1628; G06F 1/1632; G06F 1/263;
H04B 1/3883; H04B 1/3888
See application file for complete search history.

(56) References Cited

U.S. PATENT DOCUMENTS

| | | | |
|---|---|---|---|
| 5,013,898 A | 5/1991 | Glasspool | |
| 5,497,507 A | 3/1996 | Komaki | |
| 5,710,987 A * | 1/1998 | Paulick | 455/575.7 |
| 5,736,726 A | 4/1998 | VanHorn et al. | |
| 6,652,170 B1 | 11/2003 | Arnold | |
| 6,766,175 B2 | 7/2004 | Uchiyama | |
| 6,822,639 B1 | 11/2004 | Silverbrook | |
| 7,366,541 B2 | 4/2008 | Goebel et al. | |
| 7,454,170 B2 | 11/2008 | Wilhelmus | |
| 7,688,580 B2 | 3/2010 | Richardson et al. | |
| 7,791,312 B2 | 9/2010 | Kook | |
| 7,948,208 B2 | 5/2011 | Partovi | |
| 8,169,185 B2 | 5/2012 | Partovi | |
| 8,346,979 B1 | 1/2013 | Lee | |
| RE44,122 E | 4/2013 | Kumar | |
| 8,428,644 B1 | 4/2013 | Harooni | |
| 8,483,758 B2 * | 7/2013 | Huang | H04B 1/3883 361/679.41 |
| 8,577,412 B1 | 11/2013 | Bishop | |
| 2002/0013161 A1 | 1/2002 | Schaeffer et al. | |
| 2003/0003864 A1 | 1/2003 | Locke | |
| 2004/0070867 A1 | 4/2004 | Kudo | |
| 2006/0046793 A1 | 3/2006 | Hamilton et al. | |
| 2007/0103110 A1 | 5/2007 | Sagoo | |
| 2007/0223182 A1 | 9/2007 | Swan et al. | |
| 2007/0280677 A1 | 12/2007 | Drake | |
| 2008/0192410 A1 | 8/2008 | Kumar | |
| 2009/0066509 A1 * | 3/2009 | Jernstrom et al. | 340/568.1 |
| 2009/0096413 A1 | 4/2009 | Partovi | |
| 2010/0088439 A1 * | 4/2010 | Ang | G06F 1/1632 361/679.41 |
| 2012/0032632 A1 | 2/2012 | Soar | |
| 2012/0101874 A1 | 4/2012 | Ben-Haim | |
| 2012/0257008 A1 | 10/2012 | Taylor | |
| 2012/0270600 A1 | 10/2012 | Zelson | |
| 2012/0282977 A1 | 11/2012 | Haleluk | |
| 2012/0320503 A1 | 12/2012 | Yturralde et al. | |
| 2013/0109316 A1 | 5/2013 | Lee | |
| 2013/0135871 A1 | 5/2013 | Harooni | |
| 2013/0150122 A1 | 6/2013 | Kulas | |
| 2013/0260677 A1 | 10/2013 | Partovi | |
| 2013/0300204 A1 | 11/2013 | Partovi | |
| 2013/0314030 A1 | 11/2013 | Fathollahi | |
| 2013/0320340 A1 | 12/2013 | Acar et al. | |
| 2014/0028243 A1 | 1/2014 | Rayner | |
| 2014/0099526 A1 | 4/2014 | Powell et al. | |
| 2014/0152890 A1 | 6/2014 | Rayner | |
| 2014/0191033 A1 * | 7/2014 | Wojcik | G06K 7/082 235/449 |
| 2014/0191568 A1 | 7/2014 | Partovi | |
| 2014/0265762 A1 * | 9/2014 | Murphy | B23P 19/00 312/223.1 |
| 2014/0291404 A1 * | 10/2014 | Matsuoka et al. | 235/462.46 |
| 2015/0028104 A1 * | 1/2015 | Ma et al. | 235/462.08 |

FOREIGN PATENT DOCUMENTS

| | | |
|---|---|---|
| WO | 2004017613 A1 | 2/2004 |
| WO | 2011011649 A1 | 1/2011 |
| WO | WO-2012114142 | 8/2012 |

\* cited by examiner

IMAGE MODULE INCLUDING MOUNTING AND DECODER FOR MOBILE DEVICES

FIELD OF THE INVENTION

This invention relates to machine vision systems and computer-readable applications operable on a mobile device with an imaging module, such as a digital music player or cellular telephone.

BACKGROUND OF THE INVENTION

Vision systems that perform measurement, inspection, alignment of objects and/or decoding of symbology (e.g. one-dimensional and two-dimensional bar codes—also termed "IDs") are used in a wide range of applications and industries. These systems are based around the use of an image sensor (also termed an "imager"), which acquires images (typically grayscale or color, and in one, two or three dimensions) of the subject or object, and processes these acquired images using an on-board or interconnected vision system processor. The processor generally includes both processing hardware and non-transitory computer-readable program instructions that perform one or more vision system processes to generate a desired output based upon the image's processed information. This image information is typically provided within an array of image pixels each having various colors and/or intensities. In the example of an ID reader (also termed herein, a "camera"), the user or automated process acquires an image of an object that is believed to contain one or more barcodes, 2D codes (e.g. DataMatrix, QR, DotCode, etc.), or other symbol types applied by printing, Direct Part Marking (DPM), or other application techniques. The image is processed to identify code features, which are then decoded by a decoding process and/or processor obtain the inherent alphanumeric (or other) information represented by the code.

A common use for ID readers is in logistics and inventory/equipment tracking operations. These operations can entail use of handheld scanning devices by personnel who travel the floor of a worksite and apply the scanner to ID-containing surfaces of located on an object-of-interest. The data gathered by the handheld scanner is often transmitted contemporaneously, or subsequently, to a data processor (e.g. a server or a PC), using wired or wireless communication link, which includes appropriate data storage and handling applications.

The wide availability of so-called smartphones (i.e. cellular telephones that contain interactive touchscreens, cameras, microphones, wifi and Bluetooth® transceivers and robust processing capability) has transformed many aspects of personal and business activity. Such smartphones are currently available for a variety of commercial vendors, including, but not limited to, the Motorola Droid®, Apple iPhone®, and Samsung Galaxy® models. The small size and robust functionality of such handheld devices (and similar media players, such as the Apple iPod®) renders them highly useful in a variety of applications involving imaging, data handling and data communication. Various commercially available applications are available these devices, including ID readers. These applications allow a user to acquire and manipulate information contained in a wide range of printed ID types. However, devices are currently limited by their (typically slower) processing speed and more-limited imaging capabilities. Thus in an industrial/commercial setting, such devices are typically unable to handle the needs of the user.

SUMMARY OF THE INVENTION

This invention overcomes disadvantages of the prior art by providing a module into which a handheld device, such as a smartphone or media player with image handling and communications capability, is mounted. The module is water/weather-resistant or water/weatherproof and includes interconnections/link(s) to the device for power and data. The module includes an imager with optics and image acquisition/processing processors that provide high speed acquisition and handling of acquired image data—such as IDs. The acquired image data is transmitted through the link(s) to the device, where it is processed by the device processor using an instantiation of an appropriate module process application that resides within the device. The module includes various user interface elements, such as indicator lights and/or alarms that can indicate (for example) successful or unsuccessful reading of an ID. The module can include a subframe that removably mounts within the module's main body/frame and carries the device. The inner perimeter of the subframe is variable in geometry to accommodate different models and/or makes of devices, while the external perimeter and other surface features are standardized to mount within a single, (universal) main body/frame geometry. The main body/frame includes appropriate ports, windows and/or cutouts to enable optical transmission to, for example, cameras and illuminators so that various native functions of the device can be employed as desired. The main body/frame can also house a battery and charging assembly that supplies power to the device and allows charging through-for example and inductive charging unit. Appropriate transfer coils are mounted within each of the main body/frame and the external charger, respectively, to allow for the transmission of electromagnetic (EM) energy therebetween.

In an illustrative embodiment, a handheld vision system module comprises a main body constructed and arranged to be gripped by a hand of a user. A subframe that removably attaches to a receiving area formed on a surface of the module. The subframe includes an inner edge adapted to receive and retain a handheld mobile device having a first device form factor. Illustratively, processor circuitry is located within the main body and a battery is operatively connected with the processor circuitry, and is also located within the main body. The processor circuitry is arranged to generate processed image data (e.g. decoded ID image data). An imager (assembly) is also located on the main body, and is operatively connected with the processor circuitry. The imager assembly provides image data to the processor circuitry from which processed image data is generated. The imager assembly includes an image sensor and optics arranged to acquire images of a scene. A module application running on the mobile device (and its associated device operating system) allows receipt of, and manipulation of, the processed image data provided by the circuitry, and acquired from the imager. In particular, the image data can be preprocessed in the imager assembly to generate decoded (or other) relevant information, or undecoded image data can be passed from the circuitry to, for example, the module application for decoding. Illustratively, the battery is rechargeable and the system can include a charging circuit that recharges the battery from an external power source. The charging circuit can be operatively connected to an induction coil mounted on the main body, and the external charger can include a corresponding induction coil that selectively transmits energy to the induction coil mounted on the main body. Alternatively, or additionally, connector (such as a plug and socket and/or contact pad arrangement) can be mounted on the main body. The external charger can thus include a connector that removably docks with the connector on the main body to transmit power therebetween. The imager assembly can also include an integral, onboard imager processor having an ID decoding process. Illustratively, a connector, operatively connected with the processor circuitry, attaches to a connection on the device for receiving power and data. This connector can define a variety of commercially available form factors, such as an Apple standard (e.g. Lightning™) or USB-type connector. Illustratively, the connector is attached to a cable residing the receiving area, and the receiving area defines a recess with an inner perimeter. In various embodiments, an outer perimeter of the subframe engages the inner perimeter of the recess with a friction fit, and thereby seals the joint between the subframe and main body. The exemplary device can include a touch screen facing the user, and is covered with a sheet of transparent material that provides a sealing layer against moisture. The effect a seal, the sheet can engage an edge of the subframe. The subframe can include a resilient surface that facilitates both the seal and the above-described friction fit. A switch button can be located on the main body and is operatively connected to the processor circuitry This switch button is constructed and arranged to operate at least one of the imager and the mobile device—for example, triggering acquisition of an image, wherein image information (e.g. decoded data from an ID in the image) is transmitted to the mobile device over the cable link. In various embodiments, one or more indicators (e.g. LED lights, LCD screens, etc.) are located on the main body and are operatively connected to the processor circuitry constructed and arranged to report a status of at least one of the imager and the mobile device. This status can include at least one of a successful decoding of an ID in the imaged scene and unsuccessful decoding of the ID in the imaged scene. The exemplary scene can include at least one ID, in which the processor circuitry and/or the mobile device module application is constructed and arranged to decode the ID and generate information related thereto. The system can support another, differing subframe. This additional subframe can include an inner edge adapted to receive and retain a handheld mobile device having a second device form factor, and another module application running on that mobile device. The module application can be arranged to transmit information related to the image data over a wireless link using a transceiver located in the mobile device. The information can comprise decoded ID information. Illustratively, the imager is mounted in an imager module that includes an integral optics and illumination assembly. This illumination assembly can include at least one of a scene illuminator and an aimer assembly. The imager and illumination assembly are mounted in a module shell, in which the shell is constructed and arranged to rotate about at least one axis with respect to the main body. The subframe (and/or optionally, the circuitry in the main frame/body) contains at least one of an authentication processor and interface conversion circuitry interconnecting the mobile device and the processor circuitry. The mobile device typically includes a native camera assembly on a side thereof opposite a side facing the user. The main body thus includes a slot constructed and arranged to provide an optical path for the native camera assembly.

BRIEF DESCRIPTION OF THE DRAWINGS

The invention description below refers to the accompanying drawings, of which.

DETAILED DESCRIPTION

Figure 1:
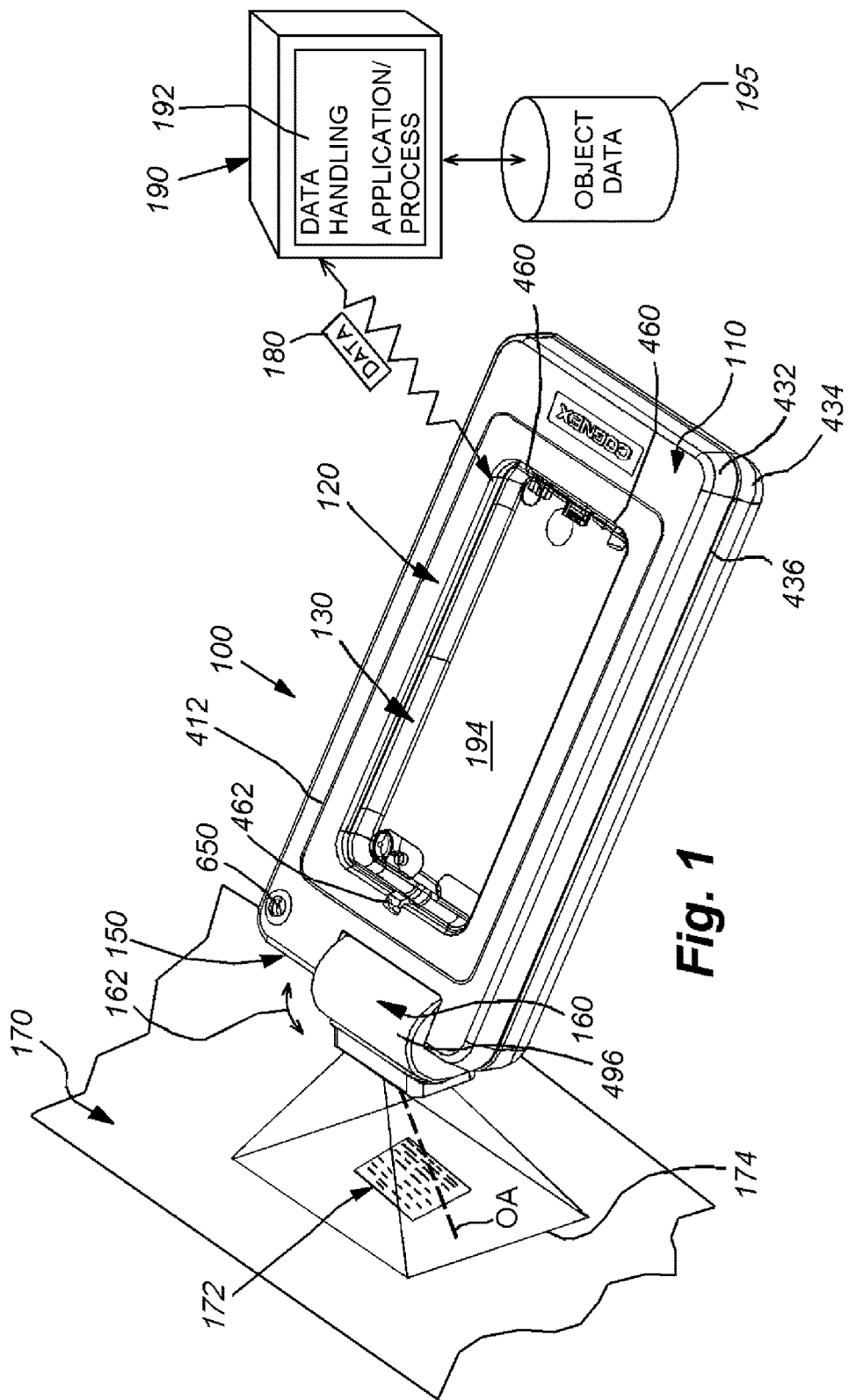
FIG. 1 is a perspective view of an illustrative embodiment of a water/weatherproof image module with a handheld device (e.g. an Apple iPhone®) mounted therein acquiring an image of a code on an exemplary object, and transmitting decoded data to a data handling application on a processing device (e.g. a server or PC)
Figure 2:
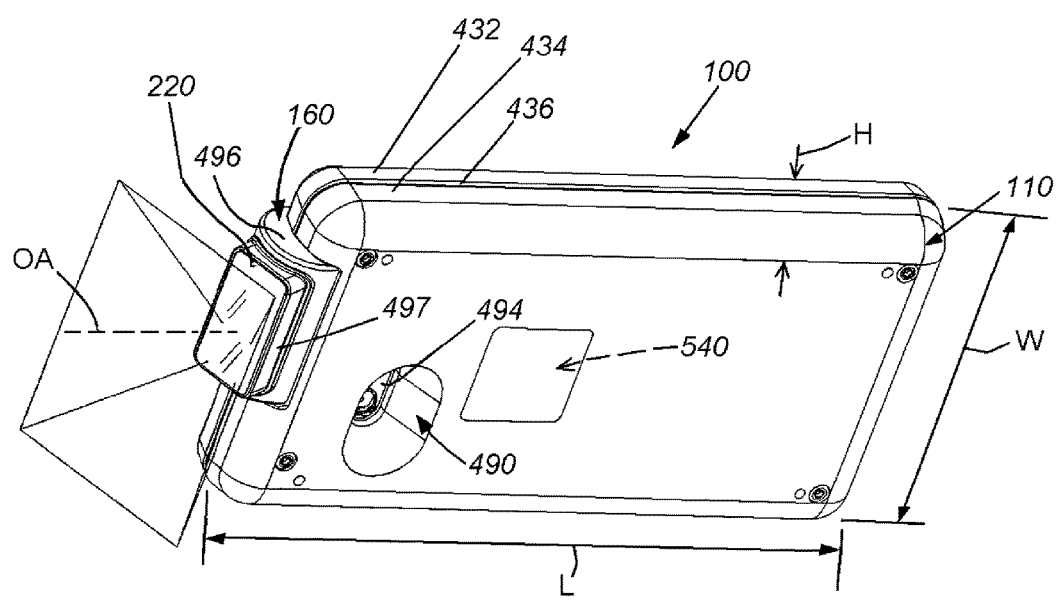
FIG. 2 is a bottom perspective view of the image module and handheld device of FIG. 1.

FIG. 1 depicts an image module assembly 100 that is constructed from a variety of durable materials, typically a polymer or composite (described further below). The module assembly is illustratively waterproof and/or weatherproof—resisting incursion of liquids due to casual contact and/or partial or full immersion. The module consists of three primary assemblies, the main frame or body 110, a subframe 120 that removably resides within the main frame 110, and a commercially available handheld, mobile device 130 (also summarily termed a "device"), such as a smartphone or media player available from a variety of sources, including, but not limited to, the Motorola Droid®, Apple iPhone®, and Samsung Galaxy® model telephones and/or iPod media player. The depicted device 130 is, by way of non-limiting example, a so-called iPod® Touch, $5^{th}$ generation media player, available from Apple, Inc. of Cupertino, Calif. Alternatively, the iPhone® 5 can be employed in the depicted embodiment some modifications (e.g. to the subframe 120) to account for differences in device thickness. The subframe 120 is arranged with an inner perimeter that removably receives and retains the outer perimeter of the device 130, and defines a particular geometry that closely conforms to this device shape. As described further below, the subframe notably allows for a single main frame/body (110) shape while a variety of subframe geometries, each adapted to a given device form factor, can be provided. All subframes mount within the main frame/body 110 in a similar manner. That is, the outer shape of each subframe is similar or identical, and/or more generally is standardized to mount within the mounting location of a common main frame/body 110. In this manner, different devices can be accommodated by the same main frame/body by employing the appropriate device-specific subframe.

As shown, the front end 150 of the main frame/body 110 includes an imager module 160, which is pivotally mounted (double-curved arrow 162) on the front end 150. This allows the user to adjust the relative angle of attack of the module's optical axis OA with respect to an object surface. As shown, an exemplary object surface 170, containing an associated ID 172 (e.g. a DPM applied code) is imaged by the module 160, with the ID residing within the module's field of view (FOV) 174. In this embodiment, the FOV 174 is rectangular, but can circumscribe other shapes in alternate embodiments.

The device 130 includes various, well-known communication and/or networking wireless transceivers, including, but not limited to, wifi, Bluetooth®, cellular protocols (e.g. CDMA), etc. These transceivers (e.g. the wifi transceiver) transmit and received data 180 to a remote data handling device such as a server or PC 190 containing an appropriate processor and data handling process 192 (for example, an inventory tracking application). Data can be stored in an appropriate storage device 195 (e.g. a disk, SAN, etc.).

With further reference to FIGS. 2-5, the structure and associated function of the module main frame/body 110 and subframe 120 is now described in further detail. The main frame/body 110 contains the electronics, imager assembly and battery power used to operate the overall unit. The dimensions of the main frame/body 110 are highly variable, but typically are arranged to fit a typical user's hand for single-handed grip and manipulation. In an embodiment, the outer dimensions of the main frame/body 110 define a length L (see FIG. 2) of approximately 670 millimeters, a width W of approximately 100 millimeters and a height H of approximately 25 millimeters. These dimensions are sufficient to house functional components and to completely receive the mobile device (device) 130 in a manner described further below. These dimensions are highly available in alternate embodiments and can be reduced as appropriate to fit particular users' hands. In an embodiment, the main frame/body 110 is constructed (e.g. molded) from a suitable polymer, such as ABS, PET, acrylic, polycarbonate, or from another appropriate material.

Figure 4:
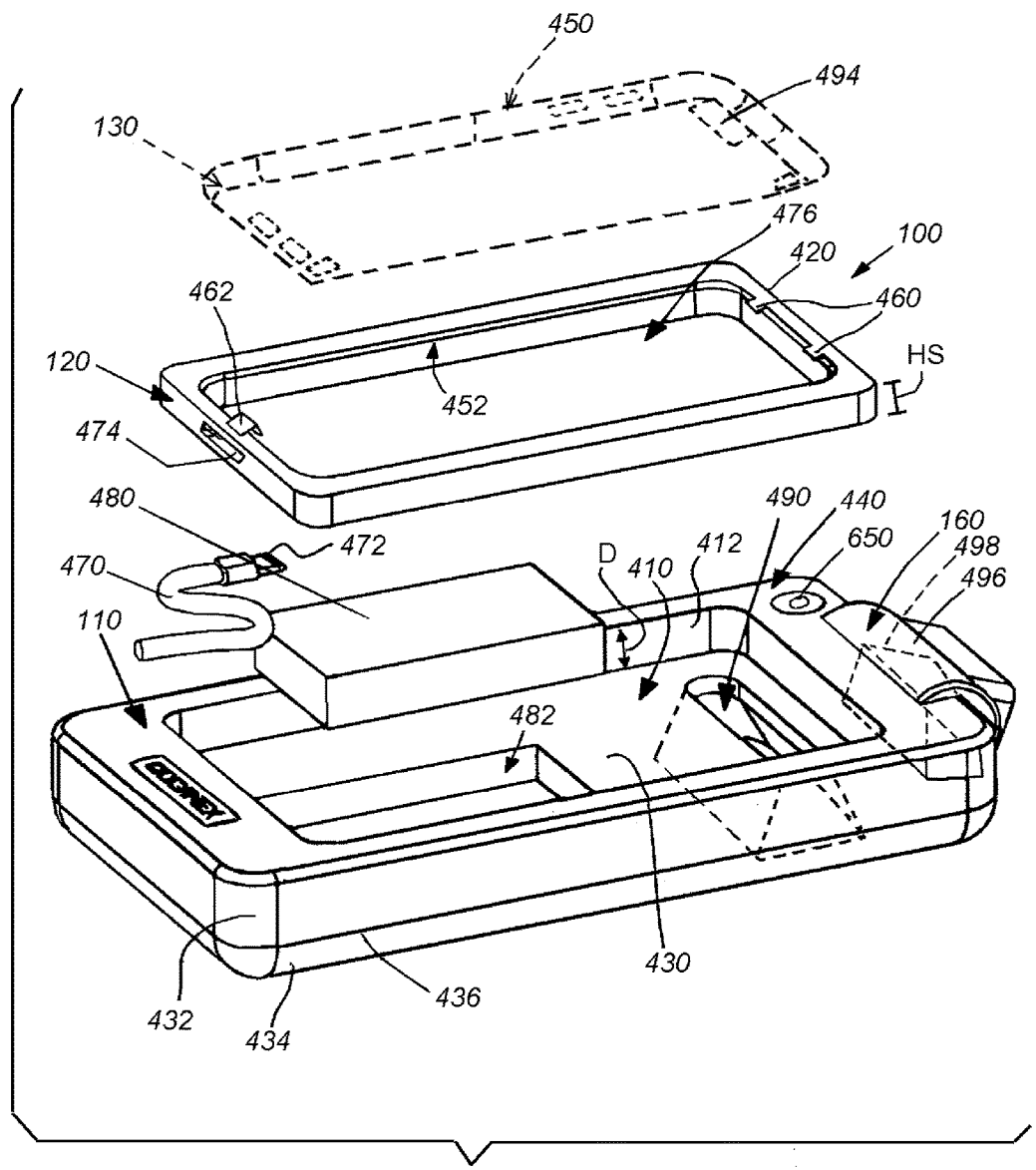
FIG. 4 is an exploded perspective view of the image module, showing the main frame/body, subframe, handheld device, interconnect cable(link) and battery.
Figure 5:
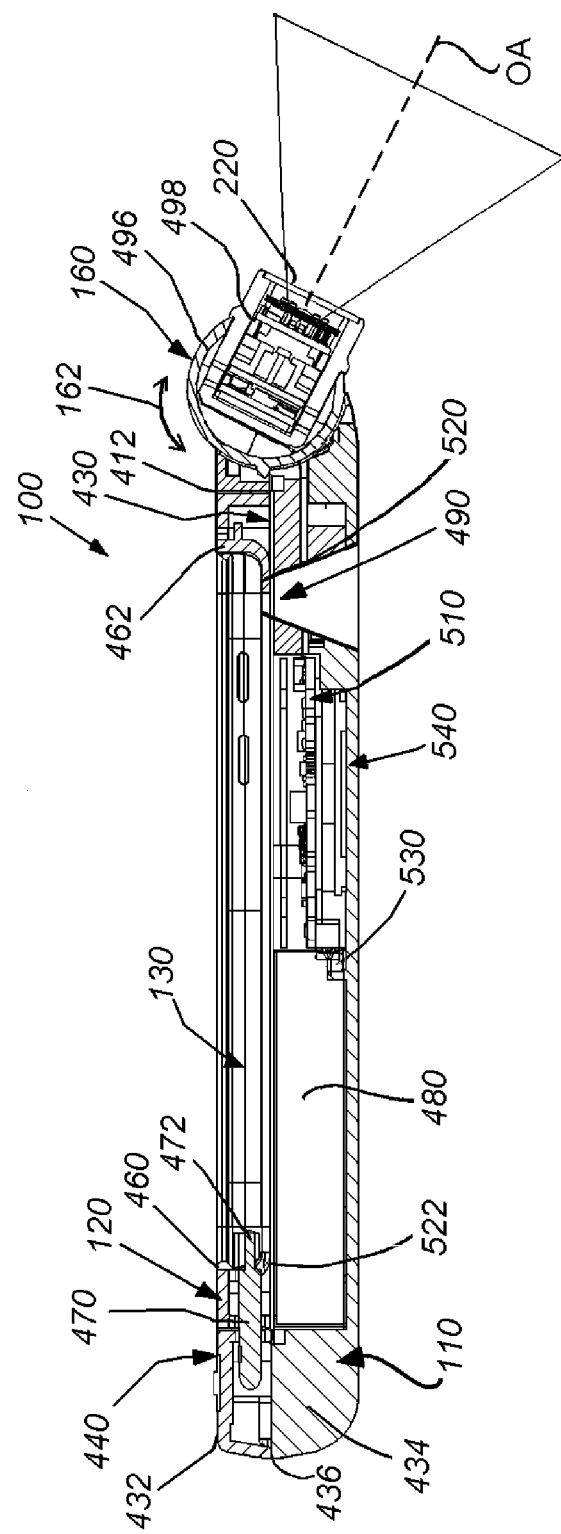
FIG. 5 is a side cross section of the image module and handheld device of taken along line 5-5 of FIG. 3.

As shown in FIG. 4, the main body/frame 110 includes a top recess 410, defined by a perimeter edge 412, which is arranged to removably receive the subframe 120. The recess includes a floor 430 that can be molded with the frame/body 110 or can be separately applied. Illustratively, the main frame/body 110 is formed from a separate top section 432 and bottom section 434, joined at a seam line 436—with the floor 430 molded as part of the top section 432. The floor 430 covers various electronic components housed within the bottom section 432, such as the main circuit board 510 (FIG. 5). The functionality of this circuit board 510 is described further below. In general, it controls power and image data handling between the module 110 and the device 130. The floor 430 resides at a depth D with respect to the top face 440 of the main body/frame 110. The subframe can be constructed from an appropriate material, such as a resilient polymer (e.g. Poron) in which the subframe flexes to grip the device, or a rigid plastic—e.g. PET, ABS, polycarbonate, etc.). It defines an outer perimeter 420 and height HS that conform to the inner perimeter 412 and depth D of the recess 410. In this manner, the subframe 120 seats within the recess with minimal projection or gapping.

The subframe is shaped to removably secure the device 130 by conforming to the device's outer perimeter/edge 450 with a corresponding subframe inner perimeter 452. The inner perimeter 452 can illustratively include a curvilinear profile so as to closely conform to the form factor of the device outer perimeter/edge 450. The inner perimeter 452 can include one or more locking tabs 460 and 462. Tabs 460 on at least one side can be fixed in place and at least one opposing tab 462 can be molded with a unitary live spring or another mechanism that allows it to be springably moved between a (normal) retaining and (biased) releasing orientation. In this manner the device 130 can be selectively secured into or removed from the subframe 120, respectively. The lower edge of the subframe 120 can include a lip 520, 522 (FIG. 5) or other inward projection that retains the bottom side of the device so that only release of the spring-loaded locking tab 462 allows withdrawal and removal of the device 130 from the subframe 120.

As shown in FIG. 4, the main frame/body 110 includes a cable 470 and associated plug 472 that removably interconnects data and power between the module circuit board 510 to the device 130. A variety of alternate connection modalities can be implemented in alternate embodiments. For example, a fixed connector can be mounted in the subframe 120 (to which the device 130 connects when mounted therein). This fixed connector removably and electrically engages contact pads on the main frame/housing recess 410 and/or floor 430. In the illustrative embodiment, the subframe 120 includes an appropriately dimensioned cutout or through-slot 474 through which the connector plug 472 passes and engages the socket at the base of the device 130. The exemplary device supports a connector plug 472 having the Apple Lightning™ form factor. Other connectors (e.g. the popular micro USB) can be provided to the cable to interconnect other exemplary devices with appropriate (well-known) communication protocols and authentication circuitry as described further below.

Note some handheld device types can necessitate more than one connector and/or connecting cable and associated cutout and/or slot in the subframe to enable both power and date connectivity between the device and the module.

The subframe 120 is removably secured in the main frame/body 110 using a variety of mechanisms and/or techniques. In an embodiment, the subframe 120 is secured to the main body/frame 110 by a friction-fit, with its outer perimeter 420 defining a resilient surface that compresses slightly when pressed into the outer perimeter 412 of the recess 410. This can provide a generally weather-tight seal between the two components. Alternatively, or additionally, the subframe can be removably secured to the main body/frame using a variety of locking structures, such as catches, detents and projections threaded fasteners, snaps, and the like. In addition, the top side of the subframe 120 can include a transparent cover formed from a conventional material, such as plastic sheeting (not shown), which provides a further seal to resist incursion of moisture into the device. The sheet can be located external to the device or, illustratively, on the surface of the device touch screen 194 in a manner similar to a conventional mobile device case system, such as those commercially available from LifeProof of San Diego, Calif. The top rim of the subframe 120 in such arrangements is adapted to seal against an engaging part of the sheet, forming a complete seal with respect to the device. The sheet allows the touchscreen 194 to be operated in a normal manner by the user. In general, the overall construction of the outer surface of the main body/frame 110 is sealed so as to resist intrusion of moisture. More notably, the dimensions of the top opening 476 of the subframe 120 are adapted to allow substantially complete access to the functional area of the device touchscreen 194. As described further below, this allows all significant functions of the device to be employed, including various interactive applications (e.g. image-handling, communications, GPS location, media play, etc.), whilst also supporting the enhanced scanning and vision system functions facilitated by the imager 160 and associated circuitry 510 of the main body/frame 110.

The circuitry 510 also supports power supply (battery) and associated charging operations for both the imager module's functional components. A rechargeable battery 480 of either a conventional or customized form factor resides in a well 482 in the floor 430 of the bottom section 434 of the main body/frame 110. The battery 480 can be based upon a variety of technologies including, but not limited to, Lithium Ion/Lithium polymer, Nickel Metal Hydride or Nickel Cadmium. It removably and electrically interconnects with contact pads 530 (FIG. 5) that are operatively connected to the circuit board 510. The battery 480 powers both the imager assembly 160 and any associated components on the main body/frame 110 (such as an alarm and read status indicator—described further below), and also interconnects power to the device 130 via the cable 470. In this manner, the (typically) smaller-capacity battery in the device 130 can be continually boosted and recharged via the (typically) larger-capacity module battery 480. The module battery 480 is, itself, charged via a charging system that is incorporated into the circuitry 510, and can employ components known to those of skill in the art. Illustratively, the charging system is wireless, and includes an induction coil assembly 540 that resides adjacent to the bottom face of the main body/frame. During a charging cycle, this coil assembly 540 removably interfaces with a charger having a corresponding induction coil. The charger is powered, typically, by 120 or 220 VAC line current, and includes circuitry that typically drives the charger induction coil at a desired lower voltage. An appropriate charging pad and/or cradle (not shown) can support the module during charging cycles. The induction coil in the charger transmits EM energy to the coil 540 in the module 100, which is converted into charging current to energize the battery 480. Alternately, the module can include a jack, defining a plug, socket and/or charging pads, which are exposed, or selectively concealed behind a (e.g. weatherproof) door or hatch. The module-mounted charging jack can define any acceptable form factor and can also include data connections to transfer application and/or acquired data to and from the module. Alternatively, data can be transferred via the device and/or via one or more transceiver(s) operatively connected to the module circuitry 510. Each of these communication arrangements can be conventional, and in accordance with skill in the art.

The main body/frame 110 enables the device's native camera and illumination functions to be employed via a frustoconical slot arrangement 490 in which the slot tapers outwardly toward the exterior of the module. The opening of the slot is placed into the floor and overlies the location on the device's back side on which its onboard camera and illuminator 494 are positioned. In this manner, the device's standard camera functionality remains available to the user via touch screen (194) control.

The imager module 160 is provided at a relatively centered location on the front edge of the main body/frame 110 of the module 100. The imager module 160 includes a semi-cylindrical outer shell 496 and a rectangular projection 497 with a front window 220 (FIG. 2) that protects the imager assembly 498 from moisture and debris. The imager assembly notably includes an image sensor, optics, illumination, aiming, an image processor and a decoding processor all within a single circuit package that is encapsulated in the rotatable shell as shown. The circuit board is provided as a flexible technology component with a serpentine shape to enable compaction.

The imager assembly 498 includes on-board optics (e.g. an M-12 lens), a camera and an image processor that includes (illustratively) a built-in ID decoder. In alternate embodiments, decoding can occur in whole or in part within another portion of the module and/or the device. A variety of image configurations and associated functions can be employed in alternate embodiments. The cylindrical shape of the outer shell 496 allows it to rotate (double arrow 162) to change the relative angle of the optical axis OA with respect to the longitudinal axis (along the length (L) direction of the module). This feature allows the user to more precisely point the imager at the expected location of IDs while maintaining the module 100 with a chosen grip and positioning relative to scanned objects. The shell 496 includes contacts or connections that enable rotation while maintaining power and data interconnection with the circuit board 510.

Figure 6:
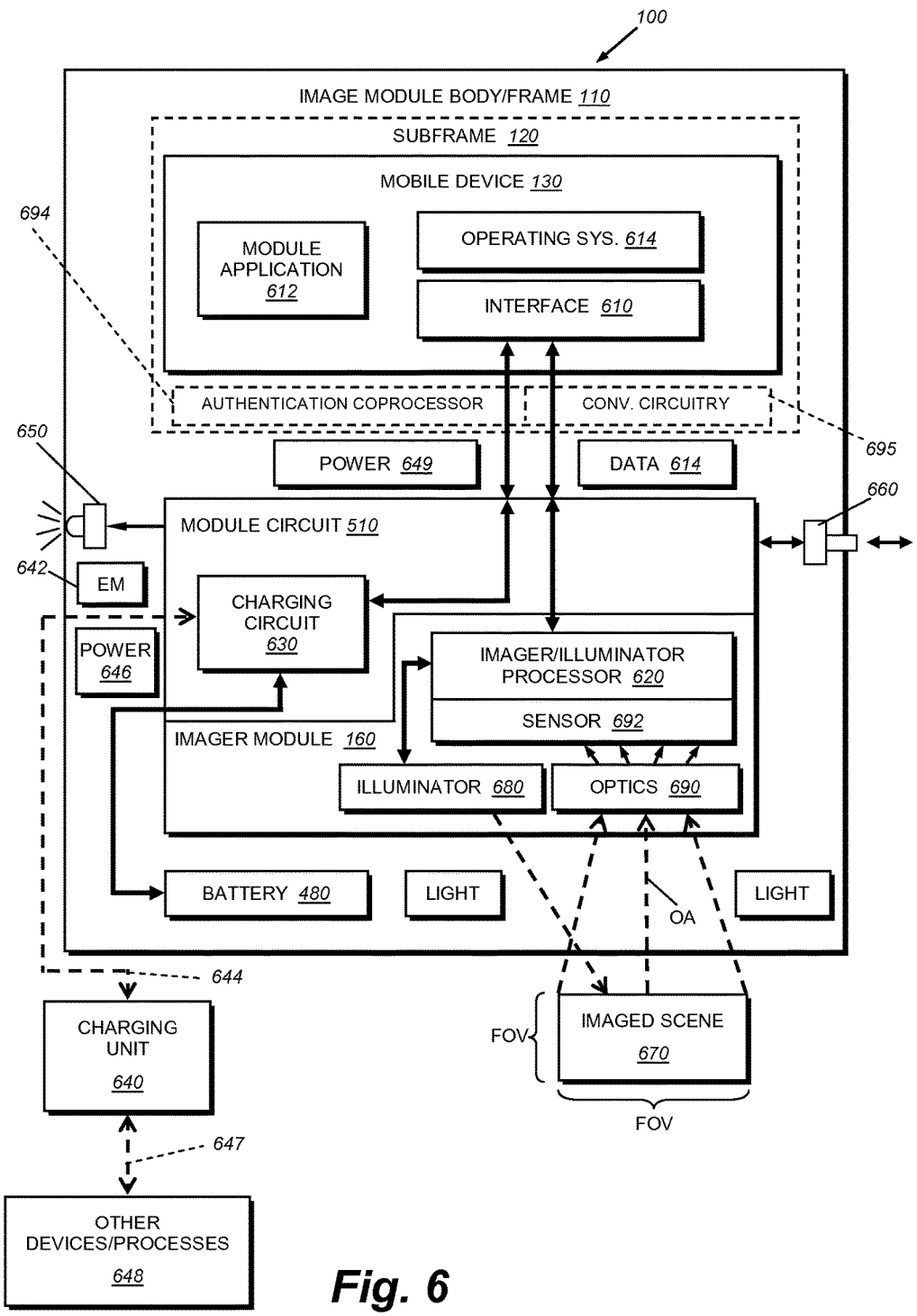
FIG. 6 is a block diagram showing the functional components, processes and processor of the image module and the handheld device of FIG. 1.

Notably, the use of a separate imager assembly 496 enables high-speed acquisition and transfer of image data to the device 130. In general, images of (for example) ID-containing regions of a scene can be acquired more rapidly and, potentially with more appropriately adapted optics than available using the native capabilities of the device. With reference to the block diagram of FIG. 6, the arrangement of functional components of the module 100 is illustrated schematically. Within the main body/frame 110 resides the mobile device 130 and associated subframe 120. The mobile device 130 contains an appropriate communication interface 610 that enable communication via a connector, such as the above-described Apple Lightning or USB. The device 130 also includes a module application 612 that interacts with the operating system of the device to handle data 614 transferred over the communication interface. The application 612 can be implemented in accordance with ordinary skill, and includes processes for decoding ID-containing image data transmitted from the imager module 160. Alternatively, ID decoding can occur entirely within the on-board imager/illuminator processor 620 housed within the imager module 160. Where decoded ID code information is generated, it is transferred by the module circuitry 510, using appropriate communication protocols, to the device interface 610 and is further handled by the module application within the device. Such handling can include storage and manipulation of the data, correlating the decoded information with other data items, such as dates, times, locations, etc. and/or packetizing (e.g. TCP/IP packets) and transmitting the data with appropriate identifiers via a network link (e.g. wifi) to a remote handling device (e.g. server/PC 190 in FIG. 1). As noted, where image data is transmitted to the device interface, the application 612 can include (or interact with) a decoding application (such as a commercially available application) that identifies and/or decodes IDs and then performs the above-described storage and manipulation steps to the decoded data.

The module circuitry 510 also includes a charging circuit 630 that interacts with a charging unit 640, as described above, which delivers EM energy 642 to the circuit. The circuit 630 controls and manages charge and discharge in the onboard module battery 480 using, for example, conventional power-handling techniques. As described above, alternate charging connections, such as a direct electrical contact system can be employed in alternate embodiments. The circuit 630 also illustratively controls the delivery of power 649 to the device 130. Note that in an alternate embodiment, the charging circuit 630 and charging unit (charger) 640 removably interconnect (dock) using an appropriate electrical connector assembly that can be represented by the link 644 that transfers electric power 646 in an appropriate voltage and phase (AC or DC) to the charging circuit. The connector link 644 can also transmit data via the circuitry 510 and the charging unit 640 can act as a wired or wireless base station that interconnects (via network link 647) with other data handling devices/processors 648, including the above-described server/PC 190.

Figure 3:
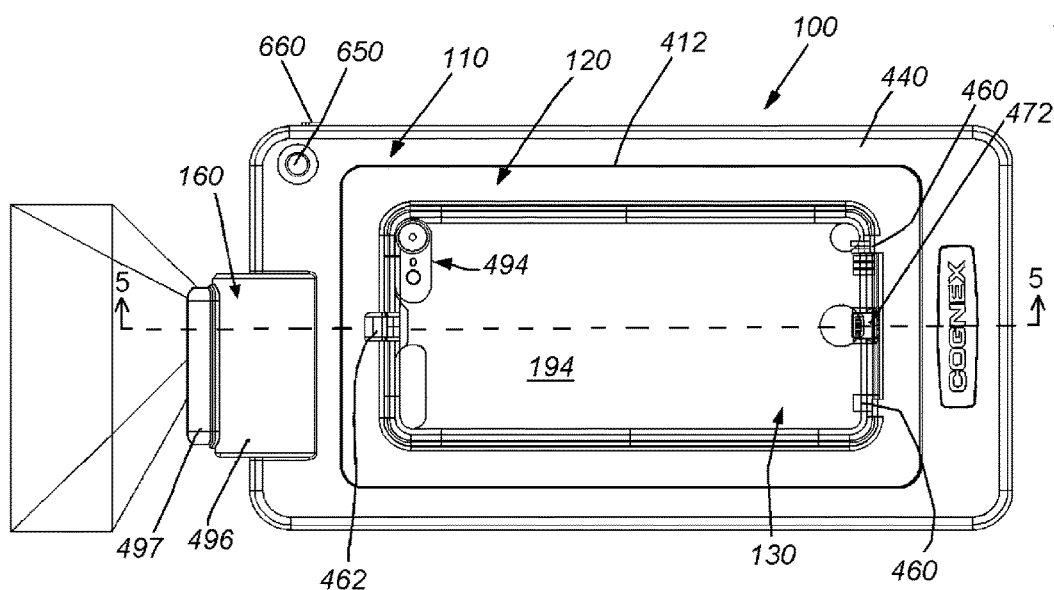
FIG. 3 is a top perspective view of the image module and handheld device of FIG. 1.

Notably, the main frame/body includes an indicator 650 that can be provided at a convenient and visible location (e.g. along the top face of the module) and that is controlled by the circuitry 510 (see also FIG. 3). This indicator 650 can flash in differing colors or patterns depending upon the status of the module—for example, a successful ID read can flash green while an unsuccessful read can flash red. Other states, such as low battery, system fault, etc. can be indicated by appropriate colors and flash patterns (e.g. fast blink, slow blink, solid color, etc.). Likewise module status can be displayed and/or accessed on the device touchscreen 194 using appropriate interface commands, or as part of the application's main screen. While not shown, an audible alarm can also be provided (e.g. a beep) via a speaker that is also controlled by the circuitry 510 and is mounted on the main body/frame 110.

The body/frame 110 also provides the user with a trigger button 660 that can be used to control image acquisition and/or scanning functions. Illustratively, pressing the button 660 causes the circuitry 510 to trigger image acquisition and follow-on processes (e.g. ID decoding) within the image module 160. The button 660 can be located (as shown in FIG. 3) in a position that allows ease of operation while the user grips and holds the module 100 relative to an object surface to-be-scanned—for example along a side of the module 100 near the front edge, where a user's thumb or forefinger can reach it. The button 660 is sealed against moisture intrusion using seals, etc. that can be conventional in the art.

The button can also be used to control other functions, such as device start-up, etc. The module application 612 instantiated on the device 130 can be adapted to interpret a button-generated signal from the circuitry to perform a predetermined device function. That is, upon startup, the initial button signal causes the device to "wake up" and begin running the application 612. The touch screen (194) can be operated to map other device functions directly to the button 660—for example, the button can be used to acquire images through the native imaging system on the device, or to place/hang-up a cellular telephone call.

In operation, the user activates the module application 612 and awaits system startup. The user then (optionally) manipulates the touch screen to select a desired function—such as scanning IDs. The user then proceeds to target a code on an object surface/imaged scene 670. The illumination assembly 680 can include one or more aimers (e.g. aiming LEDs) that assist the user in directing the optics 690 and image sensor 692 so that the optical axis OA is aligned with the target code (or other feature of interest—where a different type of vision operation is desired). The button 660 can be staged so that a partial press enables aiming and a full press triggers full illumination and image acquisition. Other techniques can be used to toggle between aiming and image acquisition. Once an image is acquired, it is handled by the module and the device in a manner described above. Information regarding a decoded ID (or other acquired image) can be displayed on the touch screen 194 after a successful scan/read.

Note that the subframe 120 (and/or circuitry 510) can include an optional authentication coprocessor 694, or similar element, residing within the data link arrangement between the module and the device 130. Where it is resident in the subframe, the device can be connected to a subframe-based connector that ties to the coprocessor 694, which is part of a subframe circuit arrangement. The subframe circuit is then connected to the main body circuitry 510 by another removable connector and (optionally) a cable arrangement. This coprocessor 694 can define a predetermined functionality, such as that specified by Apple, Inc. to facilitate communication between Apple devices and attached peripherals. The functions specified to facilitate communication are either publicly known to those of skill or can be made available by the device manufacturer. The subframe can also include appropriate interface conversion circuitry 695 that allows for conversion of voltage levels or other parameters, e.g. from one signal type, protocol and/or connector—for example USB, to another signal type, protocol and/or connector—for example, RS232.

It should clear that the handheld vision system module described herein affords the user with a versatile, durable and robust tool for ID-decoding and other vision system processes that lend themselves to handheld devices. It allows for native device functions, such as imaging and communications to be employed while the device is mounted in the module, and such native functions can be advantageously triggered and controlled, at least in part, by one or more buttons on the module body itself. It also allows the module to be used with a variety of device form factors—by swapping subframes—and enables upgrade to newer versions of the same device make as the form factor changes (i.e. a new model release).

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, For example, as used herein the terms "process" and/or "processor" should be taken broadly to include a variety of electronic hardware and/or software based functions and components. Also, as used herein various directional and orientational terms such as "vertical", "horizontal", "up", "down", "bottom", "top", "side", "front", "rear", "left", "right", and the like, are used only as relative conventions and not as absolute orientations with respect to a fixed coordinate system, such as gravity. Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. Additionally, it is expressly contemplated the form factor of the module can vary from the somewhat rectangular box shape of the illustrative embodiment, and include a variety of curvilinear forms, projections and/or protuberances. The module can also include additional interface devices, such as LCD display screens and/or readouts, and the like. Moreover, while the illustrative body/frame can be adapted to receive a plurality of differing mobile device makes, models and form factors, it is contemplated that different bodies/frames and associated subframes can be provided to accommodate differing sized and shaped mobile devices—for example, a body with a larger recess and associated subframe can be provided for the popular Samsung Galaxy® series of smartphones. Also, while the illustrative application described herein refers to ID reading/decoding, other imaging and vision system functions can be performed by the system in further embodiments—for example, OCR processes, package sizing and acquisition of overall package images (and labels thereon) for use in their cataloging and/or identification. Accordingly, this description is meant to be taken only by way of example, and not to otherwise limit the scope of this invention.

What is claimed is:

1. A handheld vision system module comprising:
a main body having a main body inner edge that defines, at least in part, a main body top recess;
a subframe having a subframe outer perimeter and a subframe inner perimeter that defines, at least in part, a subframe top recess, the subframe being removably receivable within the main body inner edge and main body top recess, the subframe being adapted to receive and retain within the subframe top recess a handheld mobile device having a first device form factor;
processor circuitry located within the main body, the processor arranged to generate processed image data;
a battery, operatively connected with the processor circuitry, located within the main body; and
an imager module located on the main body and operatively connected with the processor circuitry arranged to acquire images of a scene and transmit image data to the processor circuitry, the imager module including a semi-cylindrical shell allowing for rotation of an optical axis of the imager module with respect to a longitudinal axis of the main body.

2. The handheld vision system as set forth in claim 1 wherein the battery is rechargeable and further comprising a charging circuit that recharges the battery from an external power source, and wherein the charging circuit is operatively connected to at least one of (a) an induction coil mounted on the main body, wherein an external charger includes an induction coil that selectively transmits energy to the induction coil mounted on the main body and (b) a connector mounted on the main body, wherein the external charger includes a connector that removably docks with the connector on the main body to transmit power therebetween.

3. The handheld vision system as set forth in claim 1 wherein the processor circuitry includes an imager processor having an ID decoding process, the imager processor being located in a module with an image sensor and optics.

4. The handheld vision system as set forth in claim 1 further comprising a connector, operatively connected with the processor circuitry, that attaches to a connection on the device for receiving power and data.

5. The handheld vision system as set forth in claim 4 wherein the connector defines a USB form factor.

6. The handheld vision system as set forth in claim 5 wherein the connector is attached to a cable residing a receiving area.

7. The handheld vision system as set forth in claim 1 wherein the subframe outer perimeter engages the inner perimeter of the main body top recess with a friction fit.

8. The handheld vision system as set forth in claim 1 wherein the device includes a touch screen facing the user and that is covered with a sheet of transparent material providing a sealing layer against moisture, the sheet engaging an edge of the subframe to provide a seal therebetween.

9. The handheld vision system as set forth in claim 1 further comprising a switch button located on the main body and operatively connected to the processor circuitry, constructed and arranged to operate at least one of the imager and the mobile device.

10. The handheld vision system as set forth in claim 9 wherein the switch button is arranged to trigger acquisition of an image of the scene by the imager.

11. The handheld vision system as set forth in claim 1 further comprising an indicator located on the main body and operatively connected to the processor circuitry, constructed and arranged to report a status of at least one of the imager and the mobile device.

12. The handheld vision system as set forth in claim 11 wherein the status includes at least one of a successful decoding of an ID in the imaged scene and unsuccessful decoding of the ID in the imaged scene.

13. The handheld vision system as set forth in claim 1 wherein the imaged scene includes at least one ID and at least one of the processor circuitry and the mobile device module application is constructed and arranged to decode the ID and generate information related thereto.

14. The handheld vision system as set forth in claim 1 further comprising a second subframe, the second subframe including a second inner edge adapted to receive and retain a second handheld mobile device having a second device form factor, and a second module application running on the second mobile device having the second device form factor that allows receipt of, and manipulation of, image data provided by the circuitry acquired from the imager.

15. The handheld vision system as set forth in claim 1 further comprising a module application is arranged to transmit information related to the image data over a wireless link using a transceiver located in the mobile device.

16. The handheld device as set forth in claim 15 wherein the information comprises decoded ID information.

17. The handheld device as set forth in claim 1 wherein the imager is mounted in an imager module that includes an integral optics and illumination assembly, the illumination assembly including at least one of a scene illuminator and an aimer assembly.

18. The handheld device as set forth in claim 17 wherein the imager and illumination assembly are mounted in a module shell, the shell being constructed and arranged to rotate about at least one axis with respect to the main body.

19. The handheld device as set forth in claim 1 wherein the mobile device includes a native camera assembly on a side thereof opposite a side facing the user and wherein the main body includes a slot constructed and arranged to provide an optical path for the native camera assembly.

20. The handheld device as set forth in claim 1 where the subframe contains at least one of an authentication processor and interface conversion circuitry interconnecting the mobile device and the processor circuitry.

21. The handheld device as set forth in claim 1 wherein the processing circuitry and the battery are distinct and separate from the handheld mobile device.

* * * * *